Oct. 7, 1952           E. J. CASEY           2,612,725
FORMING AND CUTTING TOOL FOR FLORICULTURE, HORTICULTURE, AND
TURF CULTURE
Filed Feb. 21, 1950
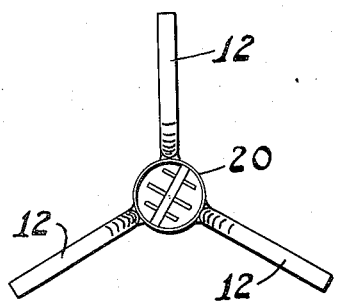
Fig. 2
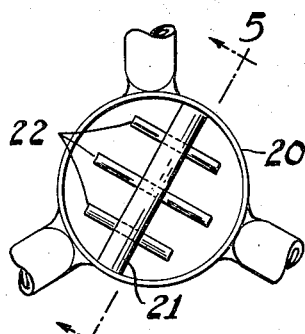
Fig. 4
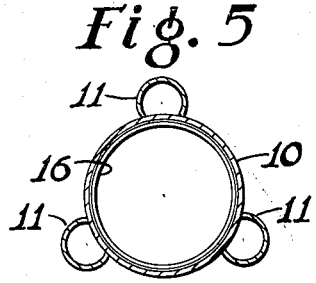
Fig. 5
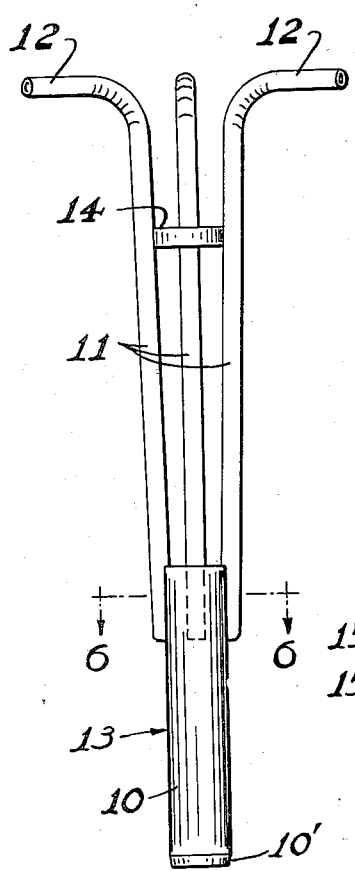
Fig. 1
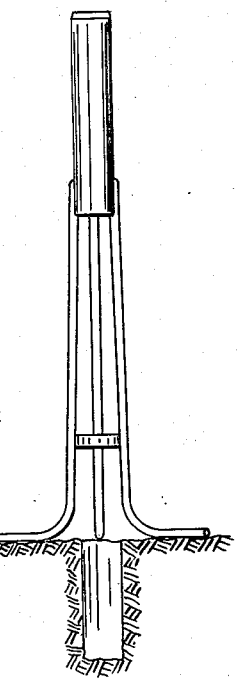
Fig. 7
Fig. 6
Fig. 3
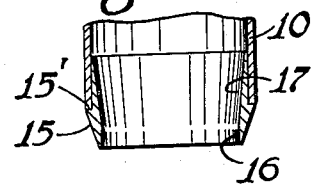
Fig. 8
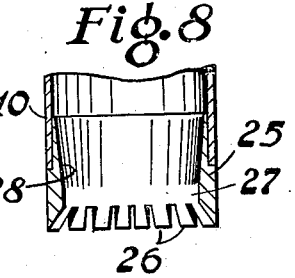
Fig. 9
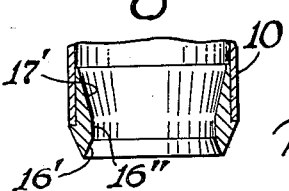
INVENTOR.
Edward J. Casey
BY William A. Zalesak
ATTORNEY Patented Oct. 7, 1952

2,612,725

UNITED STATES PATENT OFFICE 2,612,725

FORMING AND CUTTING TOOL FOR FLORI-CULTURE, HORTICULTURE, AND TURF CULTURE

Edward J. Casey, Union, N. J.

Application February 21, 1950, Serial No. 145,398

5 Claims. (Cl. 47—1)

My invention relates to a tool for floriculture, horticulture and turf culture and more particularly to a tool for forming and filling holes when planting bulbs or tuberous plants, and for coring earth for sampling and fertilizing and for improvement and propagation of turf of the finer grasses.

It is customary when planting bulbs and the like to utilize a dibble in the form of a pointed tool for punching a hole in the ground. The use of such tool results in packing the soil and forming a hole in which it is difficult to plant bulbs. It also results in air spaces under bulbs. It is difficult to make holes in the ground by this method, which is slow and laborious. While coring tools have been suggested and some forms provided for coring earth, they are not particularly suitable for large scale planting and require working close to the ground and directly in the line of planting.

While forming trenches improves the planting conditions for a bulb, this requires a great deal of labor since earth to the depth of 6 to 8 inches and 6 to 8 inches in width is removed. Where bulbs are planted in selected planting areas, it is required to remove all top soil to a depth of 6 to 8 inches to permit placing and interval spacing, at correct depth, of the selected plant bulb or tuber. This results in moving excessive amounts of soil in relation to actual cultural requirements for the plant bulb or plant tuber.

In closely planted areas it is difficult to plant bulbs without working in uncomfortable positions and without the danger of harming plants as well as destroying root formations unnecessarily in the planting operation. Most hand tools require working on the hands and knees for interplanting.

In planting by trenching, it is necessary to remove the soil from one location to another and then to return the soil in a second operation. No convenient method is provided for retaining the soil in a tool or apparatus until it is desired to back-fill.

Furthermore, in planting rows available tools require working directly in the line to be planted. Most tools available are not properly balanced and thereby result in more difficult operation of the tool. Both these features cause a disturbance of the planting area.

When holes are not properly dug and where more soil is removed than required, and where the hole is made larger than necessary, waste of fertilizer as well as labor is the result.

It is, therefore, an object of my invention to provide a tool of improved design which is particularly useful for floriculture, horticulture and turf culture, and more particularly for forming holes to a desired depth of desired proportions with ease and a minimum of labor in preparation for planting bulbs and tuberous plants.

A further object of my invention is to provide a tool which does not pack the earth and which provides a planting hole of optimum dimensions with a minimum of soil handling for fertilizing, planting, sampling earth, repairing turf, and turf culture.

Another object of my invention is to provide a well-balanced light tool which eliminates the necessity of working in the line or area to be planted and which permits the worker to work close to plants, shrubs, and the like without disturbing them or destroying root formations.

A further object of my invention is to provide a device which is capable of removing and retaining the material formed until planting has been accomplished after which back-filling can be accomplished with a reversal of the tool.

Another object of my invention is to provide such a tool which permits the worker to work in an upright position.

These and other objects will appear hereinafter.

Briefly, a tool made according to my invention comprises a tubular member having a forming portion of desired configuration including a cutting edge and a retainer portion which forms a hole of desired size and shape and retains the formed earth for release at the proper time. A guide frame is provided by three tubular handles, which may serve as vertical support members. Positioned between these handles is a soil breaker of novel design. When the tool is reversed the soil breaker breaks up and screens the formed earth being back-filled into the formed hole. When discharged, the earth from the former is guided by the handles into the soil breaker. This operation turns the soil over, aiding cultivation and aeration of the soil, and eliminating the need for manually handling the soil.

The novel features which I believe to be characteristic of my invention are set forth with particularity in the appended claims, but the invention itself will best be understood by reference to the following description taken in connection with the accompanying drawing in which Figure 1 is a side elevation of a device made according to my invention, Figure 2 is a top end view of the device shown in Figure 1, Figure 3 is an enlarged portion in section of the device made according to my invention showing the cutting and forming end of the tool, Figure 4 is an enlarged plan view of a portion of the device shown in Figure 2, Figure 5 is a section taken along the line 5—5 of Figure 4, Figure 6 is a section taken along line 6—6 of Figure 1, Figure 7 is a view of my device reversed for back-filling a formed soil pocket, Figure 8 is an enlarged portion in section of a modification of the structure shown in Figure 3, and Figure 9 is an enlarged portion in section of a still further modification of my invention.

In accordance with my invention and referring to Figure 1, I utilize the former, designated generally at 13, including an elongated tubular member 10, preferably of some light metal, having fixed in the end thereof a forming element 10' which has a cutting edge for coring and a retaining means. The forming element may be made easily detachable or may be welded or brazed to the end of the tubular member 10. It is, of course, understood that this latter member could be made integral with the tubular member. The diameter may be of the order of 2½ to 3 inches. Secured to the top of the tubular member are a plurality of elongated handle members 11 which may be secured by brazing or welding and which diverge slightly toward the end of the handle, for example about 1½ degrees to the longitudinal axis, the upper portions being provided with hand gripping elements 12 formed to extend outwardly from the longitudinal axis of said tool and lying in a common plane. These three handles nicely balance the tool and permit it to be used by the operator in a standing position, either of two adjacent gripping members being engaged, permitting the operator to apply pressure and to work from one side of the row in which the planting is being accomplished.

Supported adjacent the upper end of handle 11 is the soil breaker and screener 14 shown in greater detail in Figures 4 and 5. The device may be inverted and stood on the handle members 12 as shown in Figure 7, either while not in use or for back-filling to be described.

Referring first to the hole forming insert 10', reference is made to Figure 3. This insert may be made of some hard cutting material, for example, steel. It will be observed that this forming element is provided with an outwardly diverging or tapering side wall portion 15 and a shoulder 15', against which the end of the tubular member 10 abuts and to which it is secured. The inner diameter is constant for a short distance within the former, that is, has a straight wall 16 and then diverges outwardly as at 17 to the inner surface of the tubular member 10, which is of a larger diameter than the opening at the cutting edge. The purpose is to keep the soil tight and packed at this portion of the former so that the core when cut can be easily lifted from the ground. The diameter of the tubular member is larger than the cut core to permit the cored material to be easily ejected from the tubular member by inverting the tool, the plate-like portion of the earth packed within the portion of the forming element of constant diameter falling of its own weight when the rest of the core pulls away from this part of the core. Thus by this arrangement the core is maintained within the tubular member until it is desired to discharge the same. The outwardly tapered portion on the outside surface assists in the cutting operation at the end of the tool.

As shown in the modification in Figure 9, the portion of the inner surface may be tapered slightly inward at 16', if desired, to still further form the earth as it is forced upwardly within the tube through the portion 16'' of constant diameter to tapered portion 17'. This additional squeezing of the soil further insures that the cored material does not drop out when lifting the core from the hole made by the tool.

As shown in detail in Figures 4 and 5, the soil breaker and screener comprises ring member 20 and extending transversely thereof rod 21, supporting smaller transverse rods 22. When the tool is reversed the core is guided down to the breaker ring by means of the slightly outwardly diverging handles which guide the core to the soil breaker, preventing the core from dropping outside of the tool. As the core hits the soil breaker it disintegrates, but the breaker is of such construction that it holds back large aggregates, such as stones and roots. It is possible by sighting down the tool, to drop the plug or core in the exact location desired. It is, of course, obvious that the soil breaker can be of different shapes and forms. The soil breaker ring also acts to tie the handles together and reinforce the tool structure.

In the modification shown in Figure 8, the forming and cutting element of the tool made according to my invention includes insert 25 having the serrations or teeth 26 at its cutting end formed by slots extending from the end. The outside wall is straight sided and of a diameter equal to the outside diameter of tubular member 10 in which the insert is supported. The teeth are tapered inwardly to the forming diameter portion 27 which is of the same diameter throughout its width and which is of a diameter smaller than the inner diameter of the tubular member 10. The inside diameter of the insert 25 tapers outwardly along wall portion 28 from portion 27 to the inner wall of tubular member 10. This arrangement facilitates penetration of hard compact soil, the teeth at the same time compressing the core to be removed to the smaller forming diameter of the insert, this portion serving to retain the core or column of soil within the tubular member 10 until it is desired to back-fill.

With a device of the kind described I have been able to reduce the time for planting operations to one-tenth that now required. By cutting a flat bottomed hole to proper depth without packing soil, proper planting is assured since a hole of optimum dimensions is provided with minimum soil handling. Sufficient room is provided throughout the length of the hole for receiving the necessary fertilizer without wastage and for properly positioning the bulb. A tool, such as a light weight tong, can be used for bulb planting.

Following placement of the bulb or tuber my tool can be turned end for end directly over the hole formed. To this time the cored material is retained in the former as described above. The soil falls freely from the tubular former between the handles of the tool and through the soil breaker into the hole. The top of the soil mass enters the hole first, resulting in a complete turn over of the soil, aiding cultivation and aeration of the soil above the bulb or tuber. The soil breaker reduces the pressure of the soil as it falls, breaks up clodded soils and deflects or retains large and heavy aggregates of the soil.

The three handles nicely balance the tool and permit working from one side, thus permitting operator to stand to one side of the row being planted, which prevents disturbing the planting areas. The device provides a good clean hole in any place, even in places where space is at a premium, such as around shrubs and the like. It is also possible to utilize the tool for fertilizing and the like, taking soil samples and for numerous like purposes. The use of this tool avoids the necessity for working on the hands and knees and working in the planting area.

My device is also particularly suitable for turf culture and for sampling where it is desired to obtain more than a single sample. The tubular member is of sufficient length so that it can be inserted into the turf or soil several times in succession. Each effort results in another core or sample. Each sample forces the previous sample higher into the tubular member. When the desired number of samples is obtained as the tubular member becomes filled, it may be carefully inverted and the individual samples released one at a time. This saves much labor and time and each sample is fully protected until it is released.

While I have indicated the preferred embodiments of my invention of which I am now aware and have also indicated only one specific application for which my invention may be employed, it will be apparent that my invention is by no means limited to the exact forms illustrated or the use indicated, but that many variations may be made in the particular structure used and the purpose for which it is employed without departing from the scope of my invention as set forth in the appended claims.

What I claim as new is:

1. A tool for forming a hole, retaining soil, releasing and reducing the same, including a tubular member having at one end thereof a forming portion, said portion having a cutting edge and being tapered outwardly on the outside thereof to the outer surface of said tubular member, the inner diameter of said forming portion being constant for a short distance from the end of the forming portion and being of smaller diameter than the inside diameter of the tubular member and then tapering outwardly to the inner wall of said tubular member, a plurality of elongated handles extending from the other end of said tubular member and spaced annularly to provide a support and pressure creating arms for said tool, said handles diverging outwardly from said tubular member, and a soil breaker supported between said handles to reduce said soil and screen large aggregates when said tool is inverted to permit soil released from said forming portion to pass between and along said handles to said soil breaker.

2. A tool for horticulture and the like, including a tubular member having at one end thereof a portion provided with a cutting edge, the inner diameter of said portion being constant for a short distance adjacent the end of the tubular member provided with the cutting edge and being of smaller diameter than the inside diameter of the tubular member and tapering outwardly to the inner wall of said tubular member, a plurality of elongated handles extending from the other end of said tubular member and spaced annularly and providing a support for said tool when said tool is inverted, said handles diverging outwardly from said tubular member, and a soil breaker and screener supported between said handles and spaced from said tubular member to reduce earth and screen large aggregates when said tool is inverted to permit soil within said tubular member to pass between and along said handles to said soil breaker and screener, said soil breaker and screener including a ring shaped member, and transverse elements extending across said ring shaped elements.

3. A tool for horticulture and the like and including a tubular member having at one end thereof a cutting and forming portion, said portion being tapered outwardly on the outside surface thereof to the outer surface of said tubular member, the inner diameter of said portion decreasing for a short distance extending within said portion from the end thereof and thereafter diverging toward the inner wall of the tubular member, the smallest inner diameter of said portion being smaller than the internal diameter of said tubular member, and a plurality of elongated handle members extending from said tubular member and supporting adjacent one end thereof a soil breaker and screen including a ring-like element extending therebetween and providing a brace between said handle members and having spaced elements supported within said ring whereby when said tool is inverted earth within the tubular member will pass between said elongated handle members to said soil breaker.

4. A tool for horticulture including a tubular member having at one end thereof a forming and cutting portion having a cutting edge to be inserted into the earth, the inner diameter of said portion decreasing for a short distance from said cutting edge along the length of said portion, the inner diameter thereafter remaining constant for a short distance and thereafter diverging toward the inner wall of the tubular member, the constant inner diameter of said portion being smaller than the internal diameter of said tubular member, a plurality of elongated handle members extending from said tubular member and supporting adjacent one end thereof a soil breaker and screen extending between said handles whereby when said tool is inverted earth retained in said tubular member will pass between said elongated members to said soil breaker.

5. A tool for coring soil and reducing the same, including a tubular member for coring, retaining and releasing soil and having at one end thereof a cutting portion, a plurality of elongated tubular handle members extending from the other end of said tubular member and spaced annularly to provide a support for said tool and pressure creating arms for said tool when said tool is in use, said handles diverging slightly outwardly from said tubular member, and a soil breaker supported between said handles to reduce cored soil cut by said cutting portion and to screen large aggregates when said tool is inverted to permit said cored soil to pass between and along said handles to said soil breaker, said soil breaker including a ring member secured to said handles and providing a brace therebetween, and transversely extending elements mounted within and supported by said ring.

EDWARD J. CASEY.

REFERENCES CITED

The following references are of record in the file of this patent:

UNITED STATES PATENTS

| Number | Name | Date |
| --- | --- | --- |
| 1,653,994 | Emmet | Dec. 27, 1927 |
| 2,210,440 | Avary | Aug. 6, 1940 |
| 2,385,441 | Hill | Sept. 25, 1945 |

FOREIGN PATENTS

| Number | Country | Date |
| --- | --- | --- |
| 34,922 | Germany | Mar. 19, 1886 |
| 309,727 | Great Britain | Apr. 18, 1929 |
| 522,286 | Great Britain | June 13, 1940 |